US012706419B2

(12) United States Patent
Sasaki et al.

(10) Patent No.: US 12,706,419 B2
(45) Date of Patent: Aug. 11, 2026

(54) FIXING STRUCTURE

(71) Applicant: Yazaki Corporation, Tokyo (JP)

(72) Inventors: Yasuhiro Sasaki, Makinohara (JP); Jun Ishikawa, Tokyo (JP); Yuki Noro, Tokyo (JP)

(73) Assignee: YAZAKI CORPORATION, Tokyo (JP)

(*) Notice: Subject to any disclaimer, the term of this patent is extended or adjusted under 35 U.S.C. 154(b) by 288 days.

(21) Appl. No.: 18/503,665

(22) Filed: Nov. 7, 2023

(65) Prior Publication Data

US 2024/0154359 A1 May 9, 2024

(30) Foreign Application Priority Data

Nov. 8, 2022 (JP) ................................ 2022-178747

(51) Int. Cl.
*H01R 13/629* (2006.01)
*H01R 13/42* (2006.01)

(52) U.S. Cl.
CPC ....... *H01R 13/62933* (2013.01); *H01R 13/42* (2013.01)

(58) Field of Classification Search
CPC .......................... H01R 13/62933; H01R 13/42
USPC .......................................................... 439/372
See application file for complete search history.

(56) References Cited

U.S. PATENT DOCUMENTS

| | | | | |
|---|---|---|---|---|
| 7,281,961 B1* | 10/2007 | Sugiyama | H01R 13/4365 | 439/752 |
| 2002/0168896 A1* | 11/2002 | Suzuki | H01R 13/4365 | 439/595 |
| 2003/0176090 A1* | 9/2003 | Kozono | H01R 13/62933 | 439/157 |
| 2003/0181084 A1* | 9/2003 | Valasek, Jr. | H01R 13/62933 | 439/157 |
| 2005/0090148 A1 | 4/2005 | Sagawa et al. | | |
| 2015/0111441 A1* | 4/2015 | Suzuki | H01R 13/4365 | 439/871 |
| 2023/0143326 A1* | 5/2023 | Yamasaki | H01R 13/6581 | 439/607.01 |
| 2023/0155325 A1* | 5/2023 | Wallensteiner | H01R 13/62955 | 439/372 |

FOREIGN PATENT DOCUMENTS

| | | | |
|---|---|---|---|
| DE | 10348576 B4 * | 1/2006 | H01R 13/6272 |
| DE | 102018200423 A1 * | 7/2018 | H01R 13/631 |

(Continued)

*Primary Examiner* — Tulsidas C Patel
*Assistant Examiner* — Thomas K Quigley
(74) *Attorney, Agent, or Firm* — Sughrue Mion, PLLC

(57) ABSTRACT

A fixing structure of a connector 1 includes a housing 13 and a front holder 15. The front holder 15 includes a detection portion 151, a latching lock 152, and a restriction protrusion 153. The housing 13 includes an accommodation portion 1314, a restriction recessed portion 1315, and a latching portion **1316*a*. A restriction surface 1533 extending to cross a height direction Z is provided on the restriction protrusion 153, and a contact surface 1315*a*-1 configured to come into contact with the restriction surface 1533 and support the restriction protrusion 153 is provided on the restriction recessed portion 1315. When the latching lock 152 elastically deforms in the height direction Z, the restriction surface 1533 is in contact with the contact surface 1315*a*-1**.

4 Claims, 11 Drawing Sheets

(56) References Cited

FOREIGN PATENT DOCUMENTS

| | | | | | |
|---|---|---|---|---|---|
| EP | 1764879 | A1 | * | 3/2007 | ......... H01R 13/6272 |
| GB | 2384121 | A | * | 7/2003 | ......... H01R 13/4364 |
| GB | 2603636 | A | * | 8/2022 | ............. H01R 24/38 |
| JP | 2005-123032 | A | | 5/2005 | |
| JP | 2018-098116 | A | | 6/2018 | |
| WO | WO-2022024762 | A1 | * | 2/2022 | ............. H01R 13/52 |
| WO | WO-2023079168 | A1 | * | 5/2023 | ............. H01R 13/50 |
| WO | WO-2023238794 | A1 | * | 12/2023 | ....... H01R 13/62955 |

* cited by examiner

FIXING STRUCTURE

TECHNICAL FIELD

The present invention relates to a fixing structure.

BACKGROUND

A connector including a housing accommodating terminals and a front holder attached to the housing to doubly latch the terminals is known (for example, see Patent Document 1). In the connector described in the Patent Document 1, the terminals are latched by lances provided in terminal-accommodation chambers of the housing, and detection plates (detection portions) provided on the front holder press the lances that latch the terminals to maintain the orientations of the lances, so that the terminals are doubly latched. Then, when elastic arms provided on the front holder are latched by latching protrusions provided on the housing, the front holder attached to the housing is in a final latching state in which the attachment is completed.

RELATED ART

Patent Document

[Patent Document 1] JP 2018-098116 A

SUMMARY OF THE INVENTION

Problem to be Solved by the Invention

In the above-described connector, when the front holder is attached to the housing, it is necessary to insert the detection plates into detection plate insertion holes provided in the housing. However, in this case, in the process of attaching the front holder, the elastic arms elastically deform by the latching protrusions, and this may incline the front holder. As a result, the detection plates also displace, which makes it difficult to position the detection plates. For this reason, the detection plates may collide with opening edge portions, inner wall surfaces, or the like of the detection plate insertion holes, and damage to the detection plates becomes a problem. For this problem, the plate thickness and the width of the detection plates may be reduced, in which case the chance of collision of the detection plates can be reduced, but the strength of the detection plates will decrease. In the connector described in the Patent Document 1, a pair of ribs is provided between an inner wall surface of the front holder surrounding the outer peripheral surface of the housing and an outer wall surface of the housing facing the inner wall surface, and the inclination of the front holder is corrected by bringing the ribs into contact with each other. However, in this configuration, the size of the connector increases due to the size of the ribs.

It is an object of the present invention to provide a fixing structure capable of improving the accuracy of insertion of a detection portion without increasing in size.

Solution to Problem

In order to solve the above problems and achieve the object, a fixing structure of a connector includes a housing in a tubular shape into which a terminal is inserted and a front holder in a tubular shape configured to engage with the housing in an insertion direction of the terminal, wherein the front holder includes: a detection portion that protrudes toward the housing in the insertion direction; a latching lock provided elastically deformably in a deflection direction crossing the insertion direction and arranged spaced apart in the deflection direction from the detection portion; and a restriction protrusion arranged between the detection portion and the latching lock in the deflection direction, the housing includes: an accommodation portion that is open toward the front holder in the insertion direction and that constitutes a space for accommodating the detection portion; a latching portion configured to latch the latching lock; and a restriction recessed portion that is open toward the front holder in the insertion direction and that constitutes a space for accommodating the restriction protrusion, a restriction surface extending to cross the deflection direction is provided on the restriction protrusion, wherein a contact surface configured to come into contact with the restriction surface and support the restriction protrusion is provided on the restriction recessed portion, and when the latching lock elastically deforms in the deflection direction, the restriction surface is in contact with the contact surface.

Advantageous Effects of the Invention

According to such a configuration, a fixing structure capable of improving the accuracy of insertion of a detection portion without increasing in size can be obtained.

DETAILED DESCRIPTION OF THE EXEMPLARY EMBODIMENT

Figure 1:
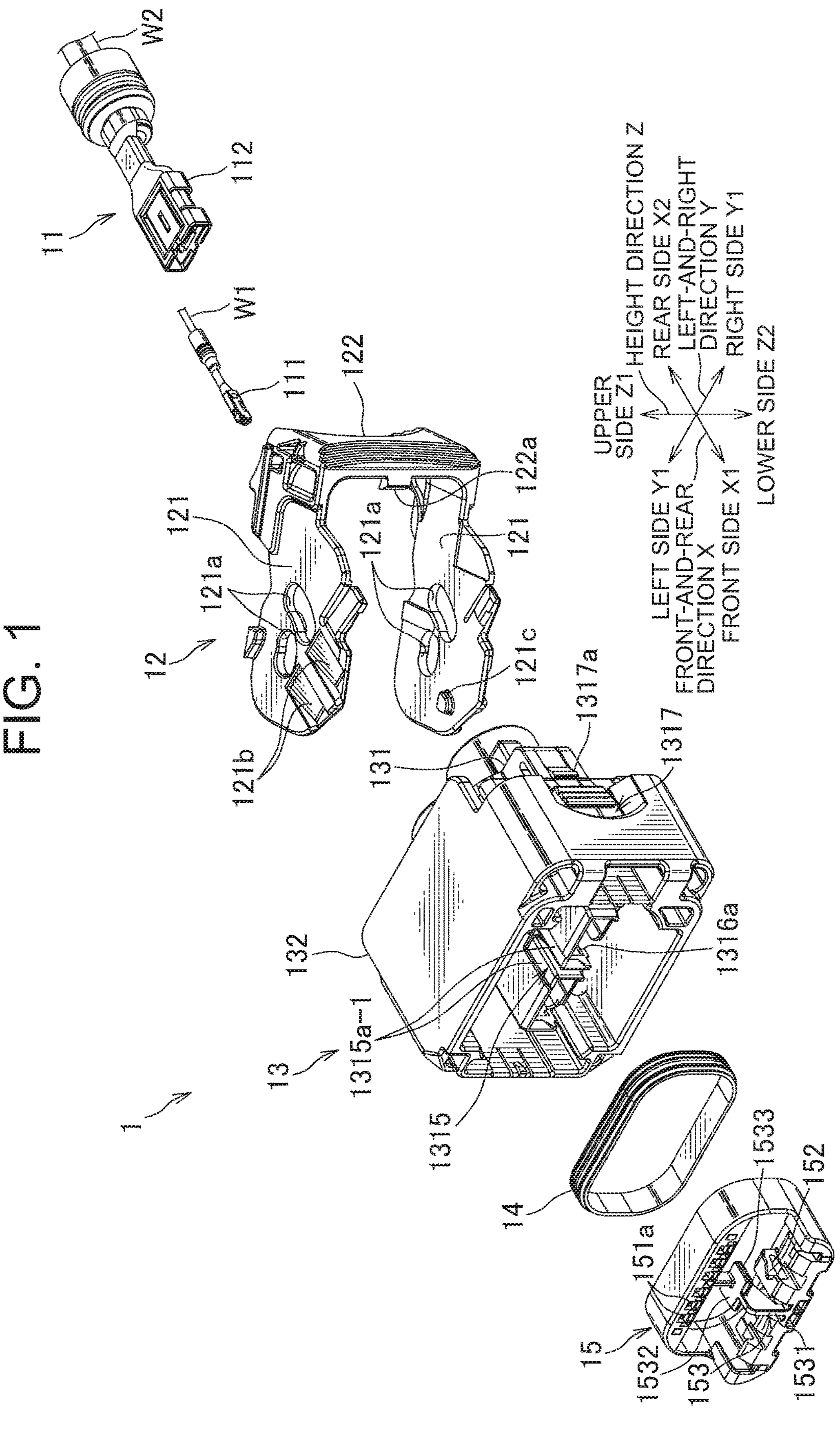
FIG. 1 is an exploded perspective view illustrating a connector constituting a fixing structure according to an embodiment of the present invention.

Hereinafter, a connector 1 having a fixing structure will be explained. The connector 1 is a female connector connected to a male connector, i.e., a mating connector 2. As illustrated in FIG. 1, the connector 1 includes terminals 11, a lever 12, a housing 13, a rubber seal 14, and a front holder 15.

In the drawings, X, Y, and Z are directions perpendicular to each other. An insertion direction in which the terminals 11 are inserted into the housing 13 is defined as a front-and-rear direction of the front holder 15 and the housing 13, and is referred to as a "front-and-rear direction X". In the front-and-rear direction X, one side is referred to as a "front side X1", and the other side is referred to as a "rear side X2". A width direction of the front holder 15 and the housing 13 is defined as a left-and-right direction, and is referred to as a "left-and-right direction Y". In the left-and-right direction Y, one side is referred to as a "left side Y1", and the other side is referred to as a "right side Y2". An upper-and-lower direction of the front holder 15 and the housing 13 is referred to as a "height direction Z". In the height direction Z, one side is referred to as an "upper side Z1", and the other side is referred to as a "lower side Z2". The height direction Z is a deflection direction of latching locks 152 explained later. Note that the above is only for the convenience of explanation, and does not necessarily match the direction the connector 1 in actual use, and does not limit the direction of the connector in actual use.

The terminals 11 are female terminals made of a conductive metal member. The terminals 11 include first terminals 111 and second terminals 112 as illustrated in FIG. 1. The first terminals 111 have a rectangular tubular shape, openings of which are in a substantially rectangular shape, and are respectively connected to end portions of first electric wires W1 on the front side X1. The second terminals 112 are formed into a rectangular tubular shape, openings of which are long in the left-and-right direction Y, and are respectively connected to end portions of second electric wires W2 on the front side X1, which has a larger diameter than the first electric wire W1.

The lever 12 includes a pair of arm portions 121 and an operation portion 122. The arm portions 121 include plate members extending in the left-and-right direction Y spaced apart in the height direction Z, such that the plate surfaces thereof face each other. Each of the arm portions 121 is formed with: boss attachment holes 121*a* penetrating in a plate thickness direction; and guide surfaces 121*b* extending to the front side X1 while inclining in such a direction that the arm portions 121 come closer to each other, i.e., in the height direction Z, from end portions of the boss attachment holes 121*a* on the front side X1. Latching protrusions 121*c* protruding in the height direction Z are formed on the wall surfaces on the back sides of the guide surfaces 121*b*. When the connector 1 is engaged with the mating connector 2, the latching protrusions 121*c* are connected to the mating connector 2, and have a function of bringing the connector 1 and the mating connector 2 into proximity with each other. The operation portion 122 is formed in a plate shape extending in the height direction Z, and connects end portions, on the right side Y2, of the arm portions 121 with each other. A claw-shaped latching claw 122*a* protruding to a diagonally rear side X2 is formed on an edge, on the front side X1, of the operation portion 122.

Figure 2A:
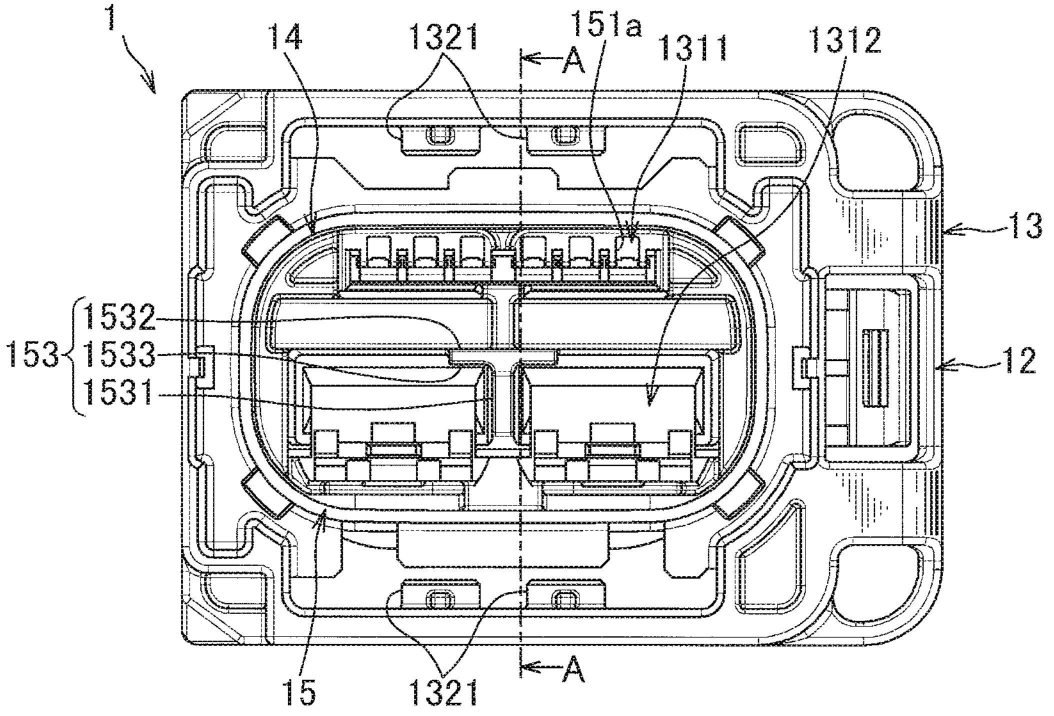
FIG. 2A is a front view of a connector as seen from the front side.
Figure 2B:
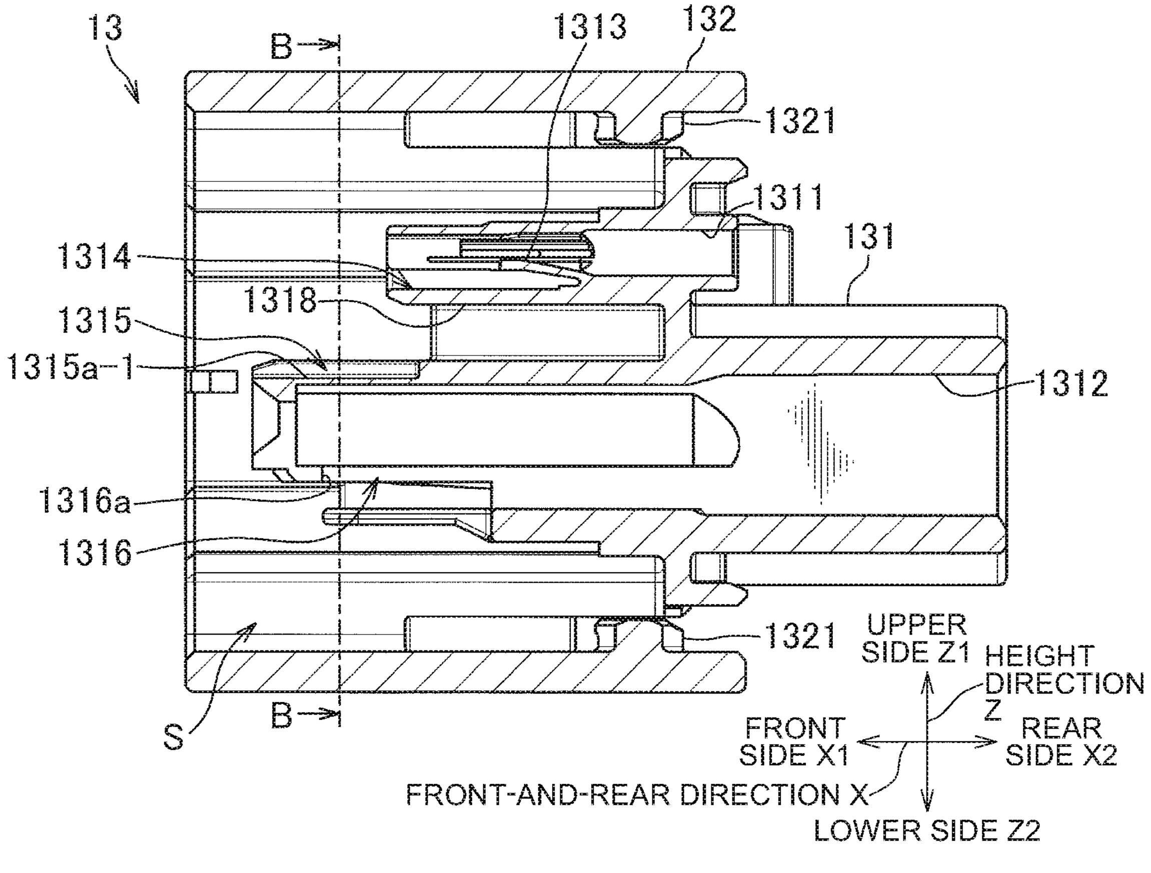
FIG. 2B is a cross-sectional view of a housing taken along line A-A of FIG. 2.

The housing 13 is a member in a substantially tubular shape into which the terminals 11 are inserted, and includes a body portion 131 and a hood portion 132 as illustrated in FIG. 2B. The body portion 131 is formed in a box shape extending in the front-and-rear direction X. First accommodation chambers 1311 penetrating the body portion 131 in the front-and-rear direction X and second accommodation chambers 1312 arranged on the lower side Z2 of the first accommodation chambers 1311 to penetrate the body portion 131 in the front-and-rear direction X are formed to penetrate the body portion 131. The first terminals 111 are inserted into the first accommodation chambers 1311 from the rear side X2. The second terminals 112 are inserted into the second accommodation chambers 1312 from the rear side X2.

Each of the first accommodation chambers 1311 is formed with a lance 1313 protruding in a diagonally upper side Z1 from the lower wall surface of the first accommodation chamber 1311 and extending to the front side X1. The lance 1313 is provided elastically deformably in the height direction Z. In the process of inserting the first terminal 111 into the first accommodation chamber 1311, the lance 1313 is pressed by the first terminal 111 to elastically deform to the lower side Z2, and when insertion of the first terminal 111 into the first accommodation chamber 1311 has been completed, the lance 1313 engages with the first terminal 111 to prevent the first terminal 111 from unplugging. In the first terminal 111, a portion on the lower side Z2 of the lance 1313 constitutes an accommodation portion 1314, i.e., a space in which the lance 1313 can elastically deform. The accommodation portion 1314 is open toward the front side X1 (toward the front holder 15 side in the insertion direction). This accommodation portion 1314 is also constituted as a space into which a detection portion 151 explained later is inserted from the front side X1. When the detection portion 151 is inserted into the accommodation portion 1314, the lance 1313 that is serving as a retainer for the first terminal 111 is restricted from elastically deforming, and accordingly, the first terminal 111 is in a doubly latched state in which it is even more difficult for the first terminal 111 to unplug.

Figure 3:
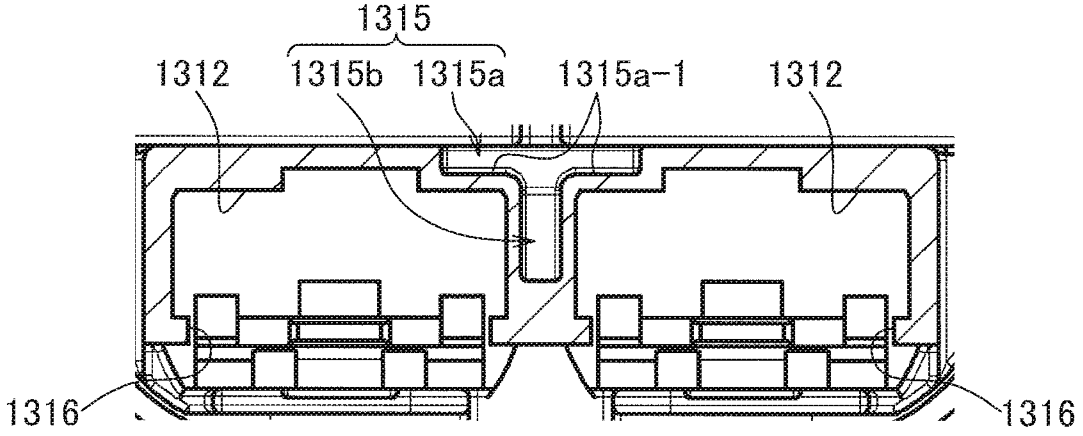
FIG. 3 is a cross-sectional view taken along line B-B of FIG. 2B as seen in the direction of arrows.

A restriction recessed portion 1315 that is open to the upper side Z1 and the front side X1 is formed in the end portion, on the front side X1, of the upper surface of the second accommodation chamber 1312. This restriction recessed portion 1315 is a space for accommodating a restriction protrusion 153, explained later, of the front holder 15. As illustrated in FIG. 3, the restriction recessed portion 1315 includes a first recessed portion 1315*a* extending in the left-and-right direction Y and a second recessed portion 1315*b* extending to the lower side Z2 from the central portion, in the left-and-right direction Y, of the first recessed portion 1315*a*. A surface on the lower side Z2 of the first recessed portion 1315*a* is a contact surface 1315*a*-1 configured to support the restriction protrusion 153 by coming into contact with the restriction surface 1533 of the restriction protrusion 153.

Holes 1316 penetrating in the height direction Z as illustrated in FIG. 2B are formed on the end portions, on the front side X1, of the lower surfaces of the second accommodation chambers 1312. The holes 1316 are portions with which the latching locks 152, explained later, of the front holder 15 engage. The edges, on the front side X1, of the holes 1316 constitute latching portions 1316*a* that face the latching locks 152 in the front-and-rear direction X. Each of the latching portions 1316*a* has a function of coming into contact with a surface of the latching lock 152 facing the front side X1 to restrict the latching lock 152 from displacing to the front side X1. Specifically, the latching portions 1316*a* latch the latching locks.

As illustrated in FIG. 1, a lever lock arm 1317 configured to latch the latching claw 122*a* of the lever 12 explained above is formed on the side wall on the right side Y2 of the body portion 131. The lever lock arm 1317 is for fixing the lever 12 to the housing 13 or releasing the fixing. The lever lock arm 1317 extends in the front-and-rear direction X. A lock latching portion 1317*a* that can elastically deform in the left-and-right direction Y is formed at the end portion of the lever lock arm 1317. The lock latching portion 1317*a* latches the latching claw 122*a* of the lever to fix the lever 12 to the housing 13 in such a state that the orientation of the lever 12 cannot be changed. When the operation portion 122 of the lever 12 is pressed inward in the left-and-right direction Y in this state, the lock latching portion 1317*a* elastically deforms, so that the latching between the lock latching portion 1317*a* and the latching claw 122*a* is released to allow the lever 12 from being detached from the housing 13.

Figure 9A:
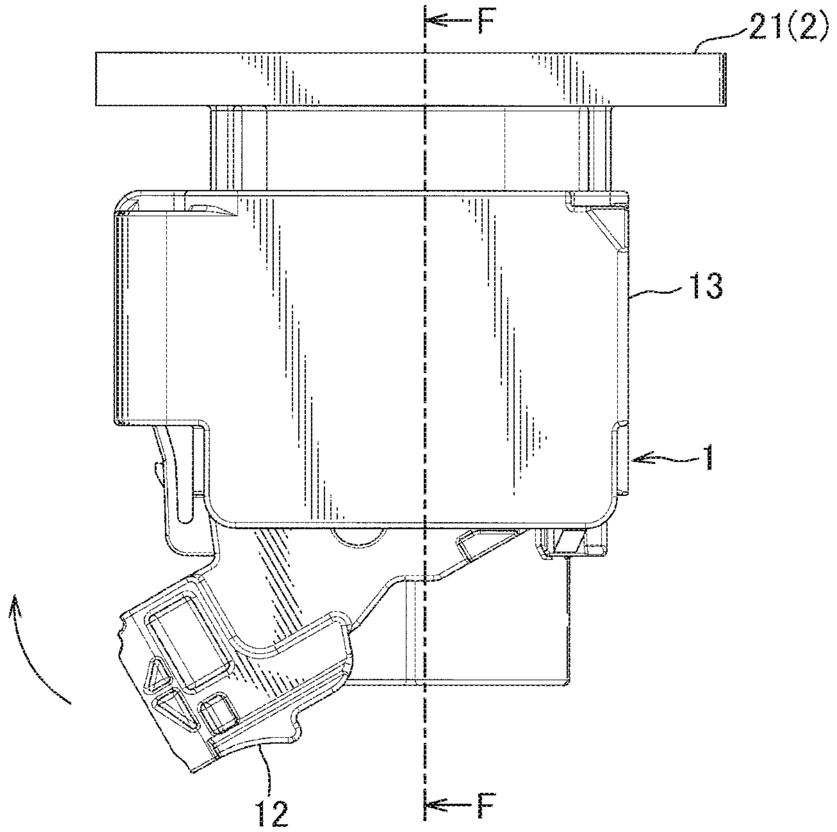
FIG. 9A is a top view of a mating connector in the process of engagement with the connector, as seen from the upper side.

As illustrated in FIG. 2B, the end portion of the hood portion 132 on the rear side X2 is integral with the outer peripheral wall of the body portion 131. A portion of the hood portion 132 on the front side X1 surrounds the outer peripheral wall of the body portion 131 with a gap in the inner-and-outer direction, so that an engagement space S in which the front holder 15 and the mating connector 2 makes engagement is formed between the hood portion 132 and the body portion 131. As illustrated in FIGS. 2A and 2B, a pair of boss portions 1321 protruding in the height direction Z is formed on the inner wall surfaces of the upper wall and the lower wall of the hood portion 132. The boss portions 1321 are portions that fit in the boss attachment holes 121*a* of the lever 12 explained above, and are provided to fit in the boss attachment holes 121*a* by being guided by the guide surfaces 121*b* of the lever 12 while traveling over the guide surfaces 121*b*. When the lever 12 is rotated in the direction indicated by the arrow in FIG. 9 while the boss portions 1321 fit in the boss attachment holes 121*a*, the lever 12 rotates about the latching protrusion 121*c*, as a fulcrum, of the lever 12 connected to the mating connector 2. At this occasion, the edges of the boss attachment holes 121*a* press the boss portions 1321, so that the housing 13 moves to the front side X1, i.e., to the mating connector 2 side.

Figure 7:
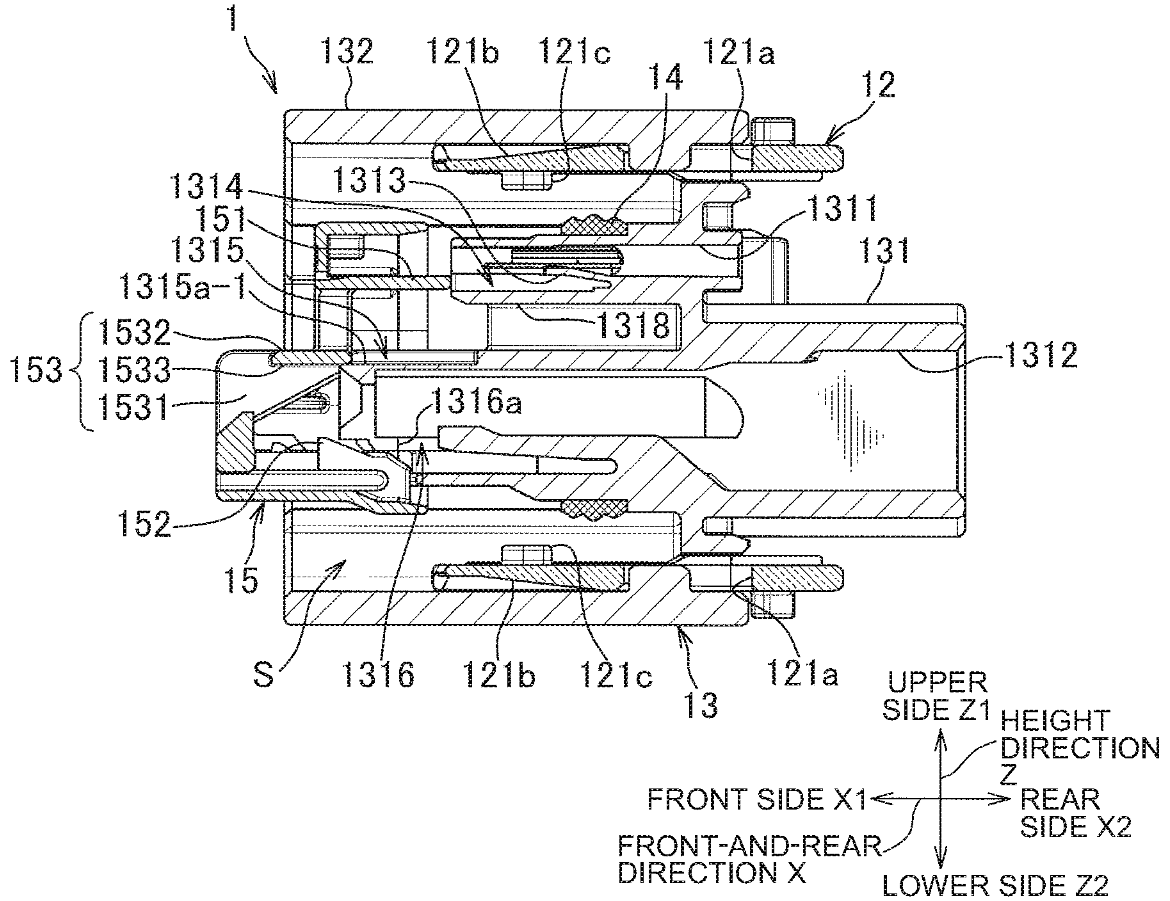
FIG. 7 is a cross-sectional view of a connector in the process of engaging the front holder with the housing.
Figure 8:
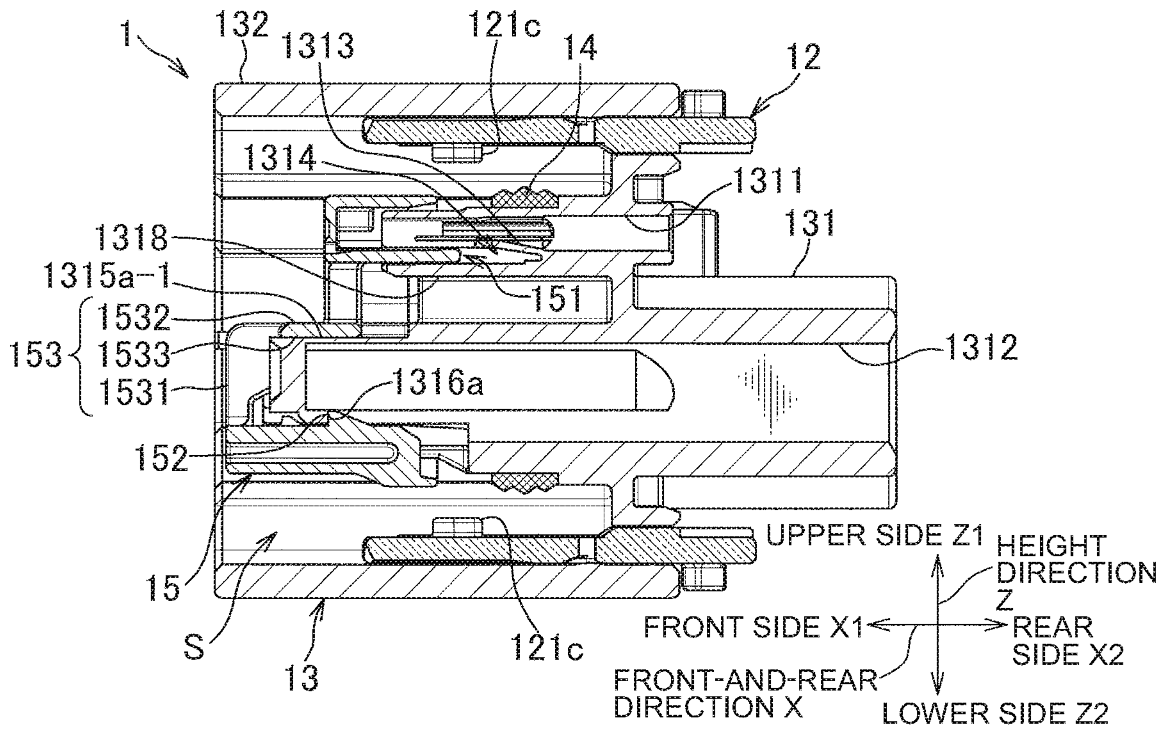
FIG. 8 is a cross-sectional view of a connector, a front holder of which has completed engagement with the housing.

As illustrated in FIG. 1, the rubber seal 14 is substantially formed in a rectangular frame shape in accordance with the outer peripheral shape of the body portion 131 of the housing 13. As illustrated in FIGS. 7 and 8, the rubber seal 14 is fitted in the housing 13 so as to surround the outer peripheral wall of the body portion 131, so that the connector 1 according to the present embodiment is configured as a waterproof-type connector.

Figure 4A:
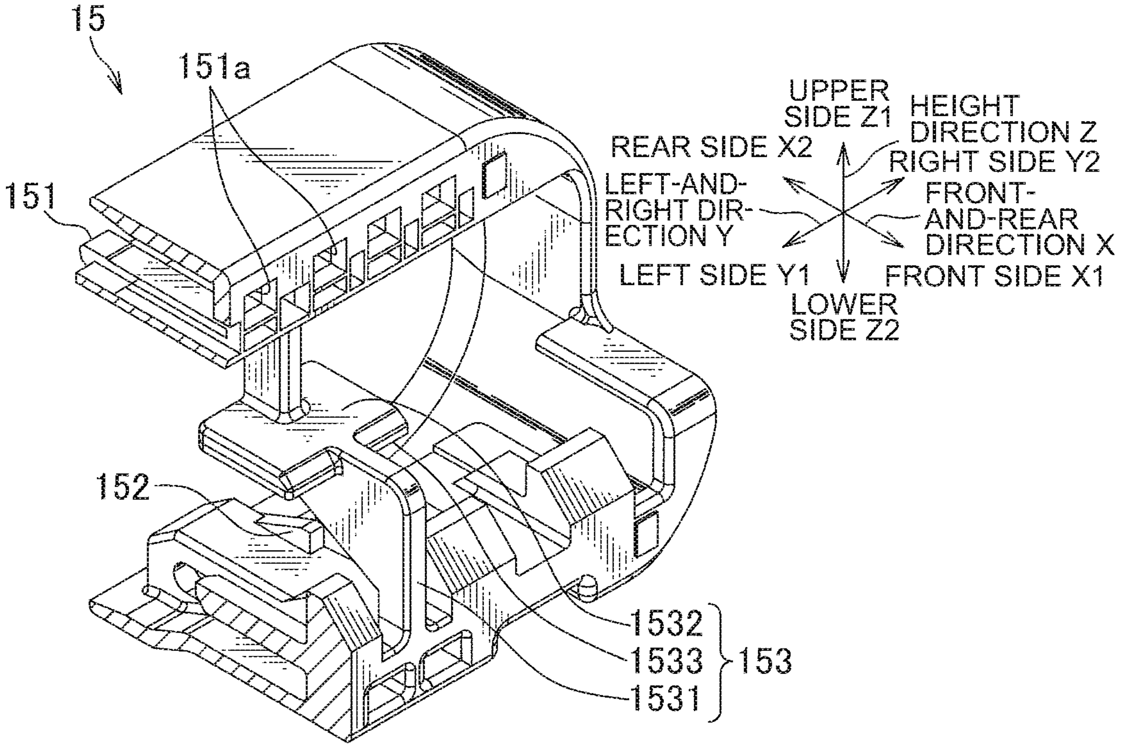
FIG. 4A is a perspective view of a front holder.
Figure 4B:
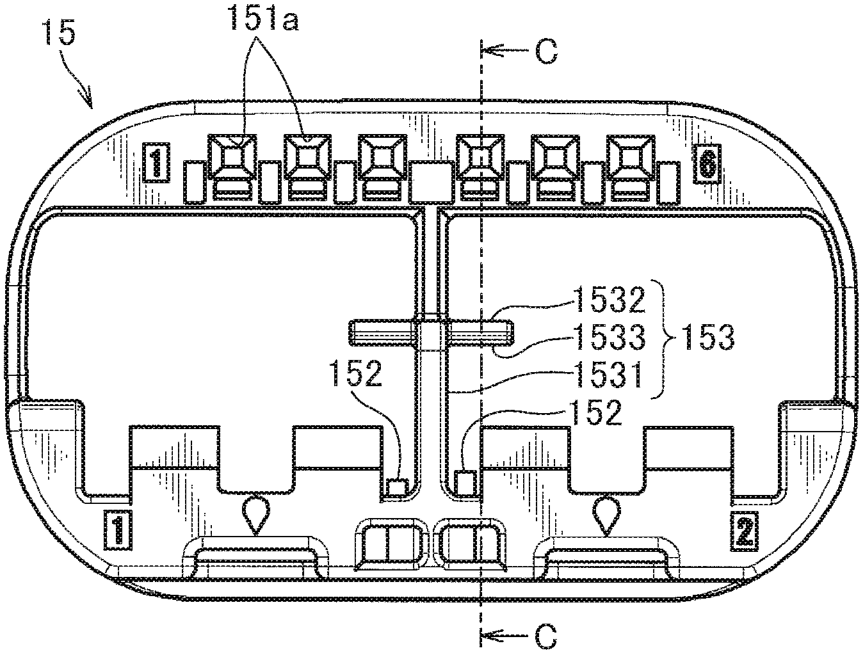
FIG. 4B is a front view of the front holder as seen from the front side.

The front holder 15 has a function of, e.g., positioning mating terminals 22 (male terminals) of the mating connector 2, and is formed in a substantially tubular shape to engage with the body portion 131 of the housing 13 from the front side X1 to the rear side X2. As illustrated in FIG. 4, the front holder 15 includes detection portions 151, the latching locks 152, and the restriction protrusion 153.

The detection portions 151 are formed in a plate shape on bottom surfaces of communication chambers 151*a* in communication with the first accommodation chambers 1311 of the housing 13, and protrude toward the rear side X2 (toward the housing side in the insertion direction). The protruding end portions of the detection portions 151 face, in the front-and-rear direction X, the accommodation portions 1314 of the housing 13, and when the front holder 15 is engaged with the housing 13, the detection portions 151 are inserted, from the front side X1 to the rear side X2, into the accommodation portions 1314, as illustrated in FIGS. 7 and 8. The latching locks 152 are portions that fit in the holes 1316 of the housing 13 and that are latched by the latching portion 1316*a* that are edge portions of the holes 1316. The latching locks 152 are arranged on the lower side Z2 of the detection portions 151 such that the detection portions 151 and the latching locks 152 are spaced apart from each other in the height direction Z. The positions of the latching locks 152 are positions respectively corresponding to the holes 1316, and from these positions, the latching locks 152 protrude in a substantially triangular shape toward the upper side Z1.

On the lower side Z2 of the latching locks 152, spaces in which the latching locks 152 can displace are provided to allow the latching locks 152 to elastically deform in the height direction Z. In the process in which the front holder 15 is engaged with the housing 13, the latching locks 152 elastically deform to the lower side Z2 while sliding on the end portions, on the front side X1, of the lower surfaces of the second accommodation chambers 1312 as illustrated in FIG. 7. When engagement of the front holder 15 with the housing 13 is completed, the latching locks 152 return back to the state before the elastic deformation, and fit in the holes 1316 of the housing 13 as illustrated in FIG. 8. In this state, the surfaces of the latching locks 152 facing the front side X1 come into contact with the latching portions 1316*a*, and the latching locks 152 are latched by the latching portions 1316*a*.

As illustrated in FIG. 4, the restriction protrusion 153 is provided between the detection portions 151 and the latching locks 152 in the height direction Z. The restriction protrusions 153 are provided to be accommodated in the restriction recessed portion 1315 of the housing 13. The restriction protrusion 153 includes a standing portion 1531 provided to rise toward the upper side Z1 from the lower wall surface of the front holder 15, a blade portion 1532 in a plate shape extending to both sides in the left-and-right direction Y from the upper end portion of the standing portion 1531, and a restriction surface 1533 constituted by a lower wall surface (lower surface) of the blade portion 1532.

Figure 5:
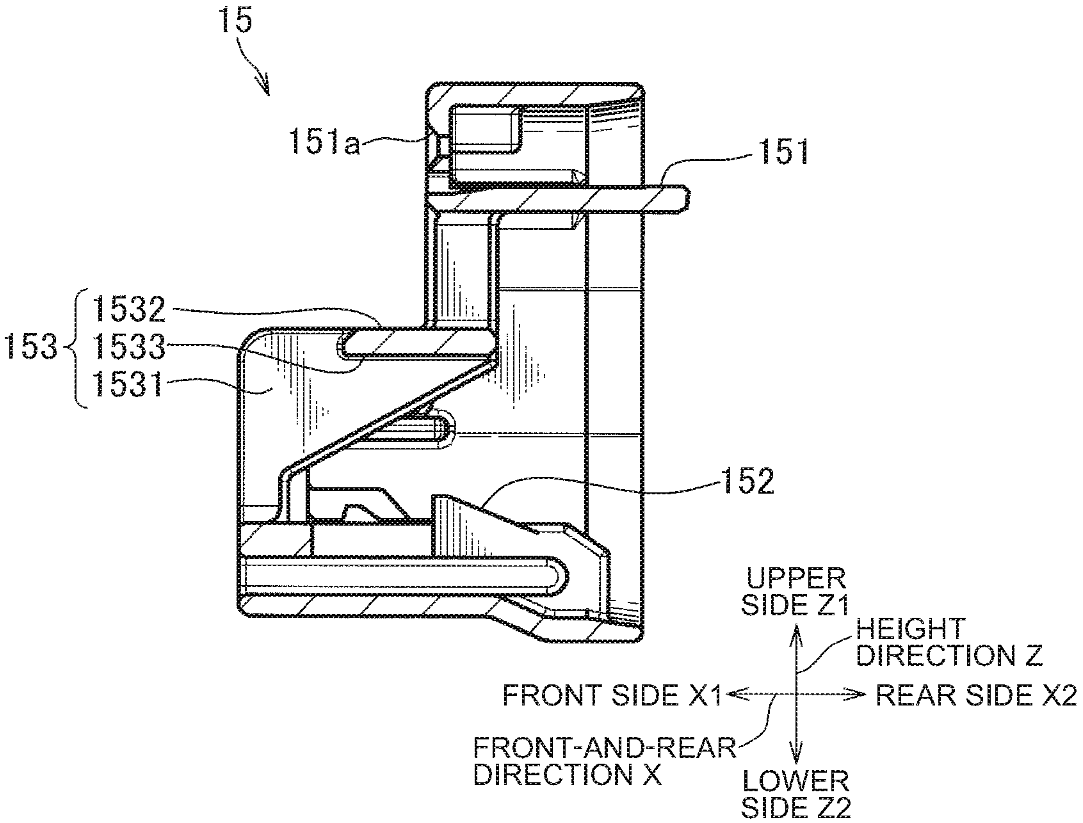
FIG. 5 is a cross-sectional view taken along line C-C of FIG. 4B as seen in the direction of arrows.

The standing portion 1531 is a portion that is accommodated in the second recessed portion 1315*b* of the restriction recessed portion 1315 explained above. The blade portion 1532 is a portion that is accommodated in the first recessed portion 1315*a* of the restriction recessed portion 1315 explained above. The restriction surface 1533 is a portion that comes into contact with the contact surface 1315*a*-1 of the restriction recessed portion 1315, and extends in the left-and-right direction Y (in a direction crossing the deflection direction). As illustrated in FIG. 5, the blade portion 1532 and the restriction surface 1533 are provided immediately above the latching locks 152, and the end portions thereof on the rear side X2 are situated closer to the rear side X2 than are the protruding end portions of the latching lock 152.

Therefore, in the process of engaging the front holder 15 with the housing 13, when the front holder 15 is fitted from the front side X1 to the rear side X2 as illustrated in FIG. 7, the restriction surface 1533 first comes into contact with the contact surface 1315*a*-1. Then, after the restriction surface 1533 comes into contact with and supported by the contact surface 1315a-1, the latching locks 152 slide on the end portions, on the front side X1, of the lower surfaces of the second accommodation chambers 1312. In other words, when the latching locks 152 elastically deform in the deflection direction, the restriction surface 1533 first comes into contact with the contact surface 1315a-1.

As hereinabove described, the fixing structure according to the present embodiment is the fixing structure of the connector 1, including the housing 13 in the tubular shape into which the terminals 11 are inserted and the front holder 15 in the tubular shape configured to engage with the housing 13 in the front-and-rear direction X (in the insertion direction of the terminal 11). The front holder 15 includes the detection portion 151 that protrudes toward the rear side X2 (toward the housing side in the insertion direction), the latching lock 152 provided elastically deformably in the height direction Z (in a deflection direction crossing the insertion direction) and arranged spaced apart in the height direction Z from the detection portion 151, and the restriction protrusion 153 arranged between the detection portion 151 and the latching lock 152 in the height direction Z. The housing 13 includes the accommodation portion 1314 that is open toward the front side X1 (toward the front holder side in the insertion direction) and that constitutes a space for accommodating the detection portion 151, the latching portion 1316a configured to latch the latching lock 152, and the restriction recessed portion 1315 that is open toward the front side X1 (toward the front holder side in the insertion direction) and that constitutes a space for accommodating the restriction protrusion 153. The restriction surface 1533 extending to cross the height direction Z is provided on the restriction protrusion 153, the contact surface 1315a-1 configured to come into contact with the restriction surface 1533 and support the restriction protrusion 153 is provided on the restriction recessed portion 1315, and when the latching lock 152 elastically deforms in the height direction Z, the restriction surface 1533 is in contact with the contact surface 1315a-1.

According to such a configuration, when the latching lock 152 elastically deforms, the restriction surface 1533 provided on the restriction protrusion 153 of the front holder 15 is supported by the contact surface 1315a-1 provided on the restriction recessed portion 1315 of the housing 13. For this reason, even when the latching lock 152 of the front holder 15 elastically deforms in the height direction Z, and accordingly, e.g., portions around the latching lock 152 of the front holder 15 starts to deform, the detection portion 151 is less likely to be affected by the deformation. In other words, a stress in the height direction Z caused by elastic deformation of the latching lock 152 is absorbed, on the way to the detection portion 151, by the contact surface 1315a-1 that supports the restriction surface 1533 extending in a direction crossing the height direction Z. For this reason, the detection portion 151 is less likely to be affected by elastic deformation of the latching lock 152, and the detection portion 151 of the front holder 15 are less likely to displace. Accordingly, the detection portion 151 can be accurately accommodated in the accommodation portion 1314 of the housing 13 without coming into contact with the opening edge portion or the like of the accommodation portion 1314. The restriction protrusion 153 is provided between the detection portion 151 and the latching lock 152, i.e., a position situated in the housing 13 when the front holder 15 is engaged with the housing 13. Therefore, as compared with a conventional configuration in which a pair of ribs is provided between an inner wall surface of the front holder surrounding the outer peripheral surface of the housing and an outer wall surface of the housing facing the inner wall surface, an increase in the size of the connector due to the size of the ribs can be alleviated. Therefore, a fixing structure capable of improving the accuracy of insertion of the detection portion 151 without increasing in size can be obtained.

Furthermore, in the present embodiment, because the blade portion 1532 is provided, the restriction surface 1533 is provided to extend to both left and right sides of the standing portion 1531. Therefore, when the restriction surface 1533 is supported by the contact surface 1315a-1, the stress in the height direction Z applied to the front holder 15 can be received in a balanced manner by both left and right sides. Therefore, an inclination of the front holder 15 in the left-and-right direction Y can be alleviated.

Figure 6A:
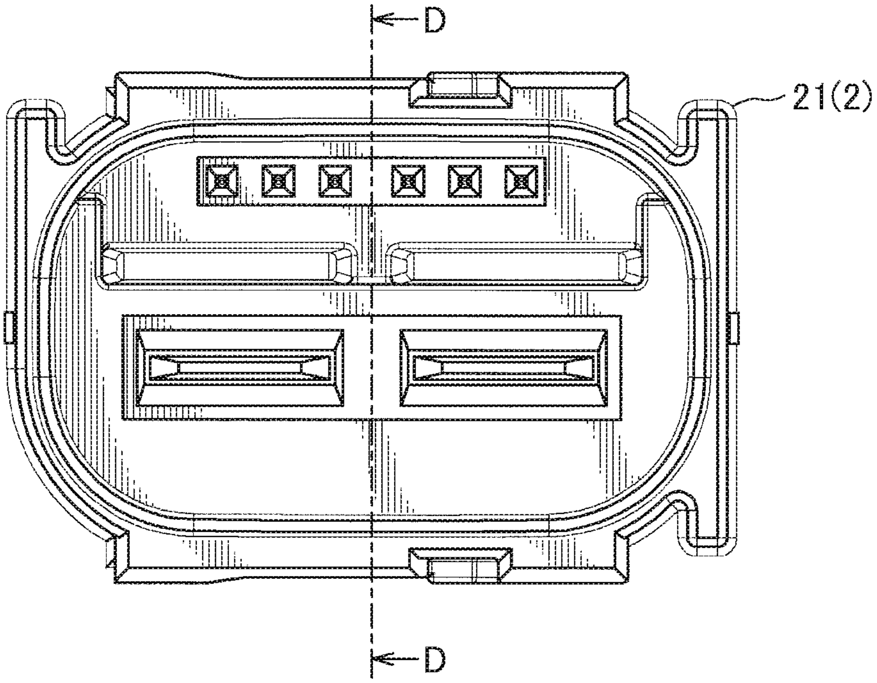
FIG. 6A is a front view of a mating connector as seen from the front side.
Figure 6B:
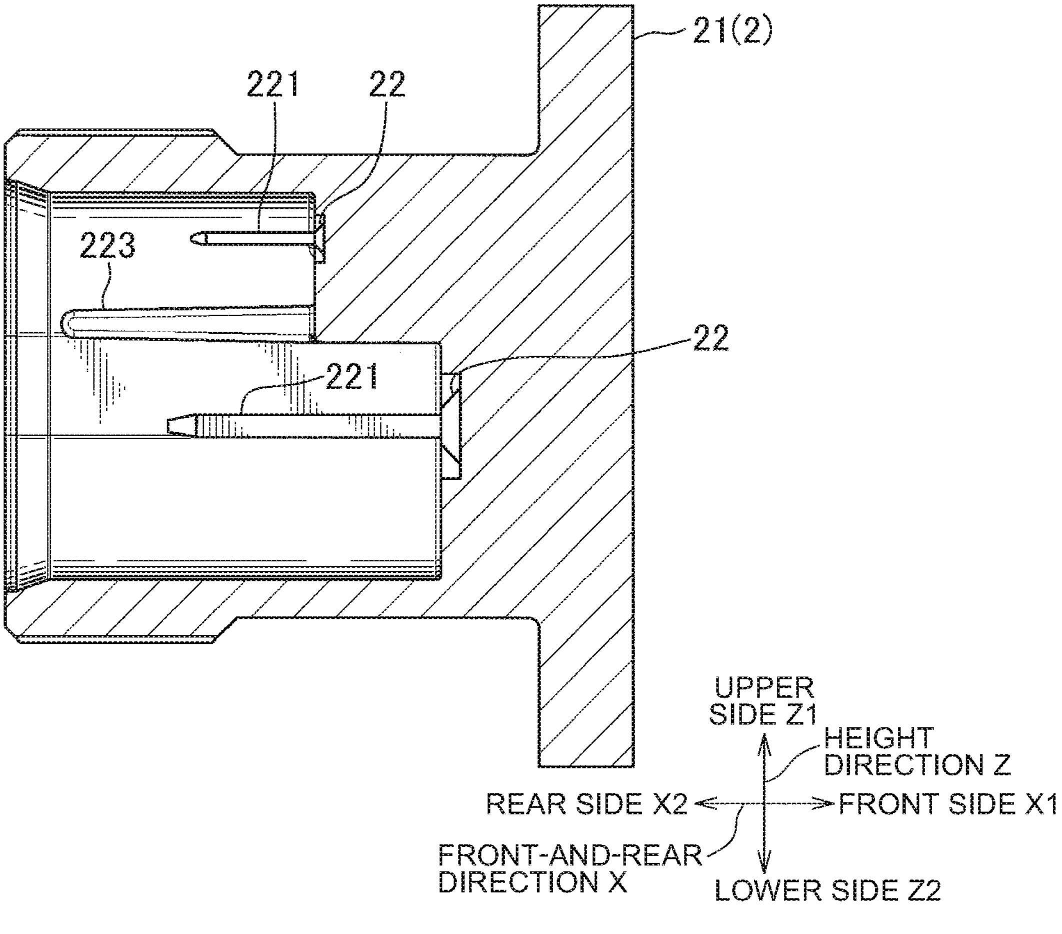
FIG. 6B is a cross-sectional view taken along line D-D of FIG. 6A as seen in the direction of arrows.

Next, a connection structure for connecting the mating connector 2 to the connector 1 is explained. The connector 1 constituting the connection structure is the connector 1 explained above. The mating connector 2 constituting the connection structure is a male connector connected to the connector 1. As illustrated in FIG. 6B, the mating connector 2 is open toward the rear side X2, and includes a mating housing 21 that fits in the engagement space S of the housing 13 of the connector 1. The mating terminals 22 (male terminals) configured to be connected to the terminals 11 are inserted into the mating housing 21, and tabs 221 provided at the tips of the mating terminals 22 protrude in the mating housing 21. In this case, the tabs 221 on the upper side Z1 in FIG. 6B correspond to the first terminals 111 explained above, and the tabs 221 on the lower side Z2 correspond to the second terminals 112 explained above.

Figure 9B:
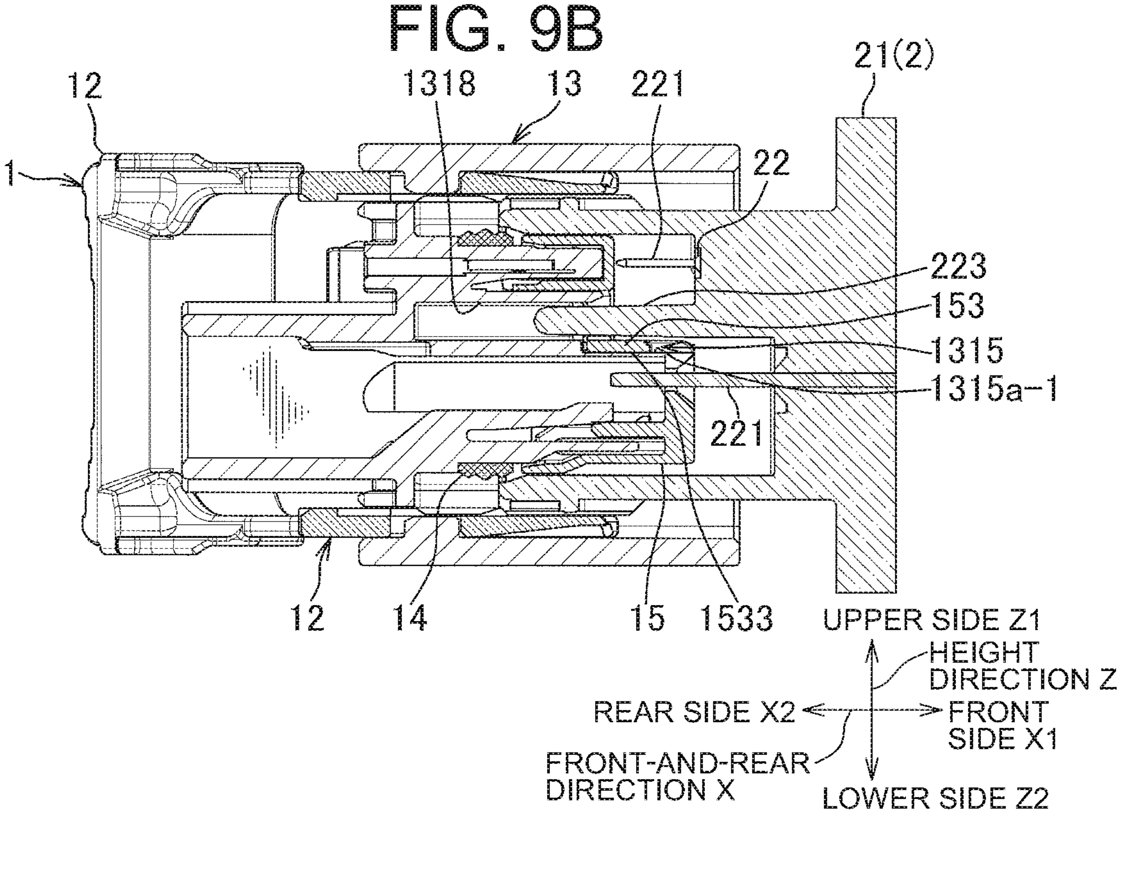
FIG. 9B is a cross-sectional view taken along line F-F of FIG. 9A as seen in the direction of arrows.
Figure 10A:
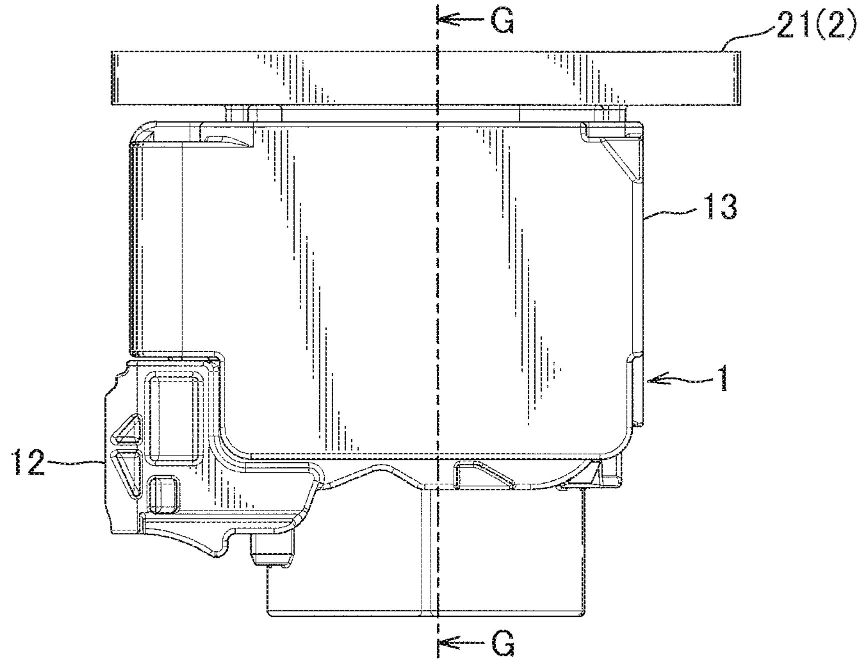
FIG. 10A is a top view of a mating connector that has completed engagement with the connector, as seen from the upper side.
Figure 10B:
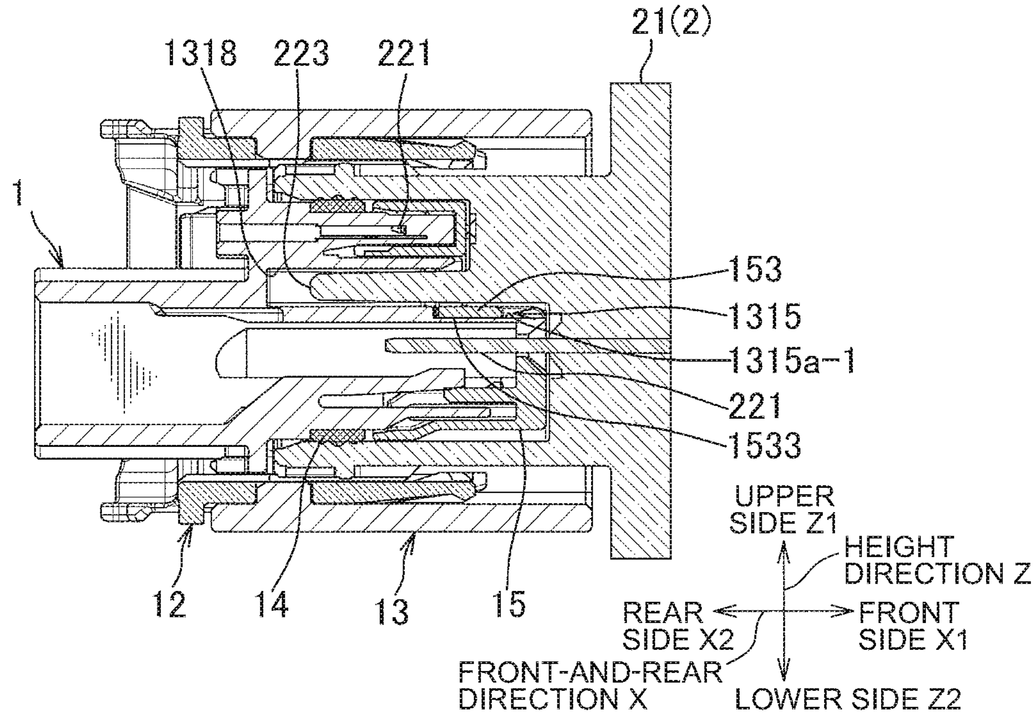
FIG. 10B is a cross-sectional view taken along line G-G of FIG. 10A as seen in the direction of arrows.

Prying engagement preventing portions 223 are formed between the tabs 221 in the height direction Z. As illustrated in FIG. 9B, the prying engagement preventing portions 223 are portions that are inserted into a gap 1318 formed between the first accommodation chambers 1311 and the second accommodation chambers 1312 in the height direction Z when the mating connector 2 is engaged with the connector 1. As illustrated in FIG. 10B, the prying engagement preventing portions 223 are in contact with the upper surface (i.e., a surface opposite to the restriction surface 1533) of the restriction protrusion 153 when engagement of the mating connector 2 with the connector 1 is completed. In this state, the restriction protrusion 153 is sandwiched in the height direction Z between the contact surface 1315a-1 of the restriction recessed portion 1315 and the lower surfaces of the prying engagement preventing portions 223, so that displacement of the restriction protrusion 153 in the height direction Z is restricted.

According to such a configuration, the restriction protrusion 153 is sandwiched between the prying engagement preventing portions 223 provided on the mating connector 2 and the contact surface 1315a-1 of the restriction recessed portion 1315 provided on housing 13, so that displacement of the restriction protrusion 153 in the height direction Z can be restricted. Therefore, the restriction protrusion 153 can be prevented from deforming or displacing, when the mating connector 2 is engaged with the connector 1.

Although the embodiment and modifications of the fixing structure have been hereinabove described in detail with reference to the drawings, the specific configuration is not limited to the embodiment, and even if there is a change in design without departing from the scope of the present invention, such change is included in the present invention.

Figure 11:
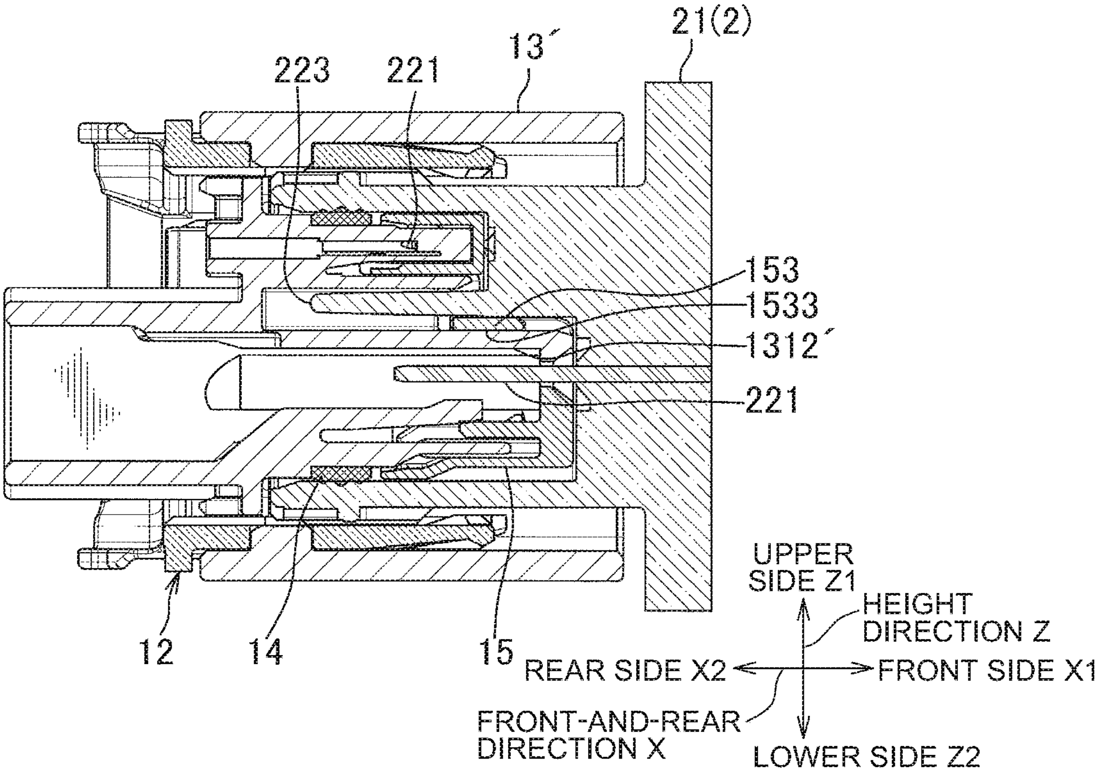
FIG. 11 is an assembly cross-sectional view illustrating a connector that does not have a restriction recessed portion, and illustrating a mating connector.

FIG. 11 is an assembly cross-sectional view illustrating a connector 1 that does not have the restriction recessed portion 1315, and illustrating a mating connector 2. The connector 1 includes a housing 13'. The housing 13' is provided with second accommodation chambers 1312' corresponding to the second accommodation chambers 1312 explained above. The second accommodation chambers 1312' are not provided with the restriction recessed portion 1315. In this configuration, when the front holder 15 is engaged with the housing 13, the restriction surface 1533 of the restriction protrusion 153 comes into contact with the upper surfaces of the second accommodation chambers 1312'. The upper surfaces of the second accommodation chambers 1312' have a function similar to the contact surface **1315*a*-1** explained above.

According to such a configuration, the same actions and effects as those of the embodiment explained above can be achieved. Furthermore, because the restriction recessed portion 1315 is not provided, the structure of the housing 13' can be simplified. In the configuration in which the restriction recessed portion 1315 is not provided, however, a space in which the restriction protrusion 153 is inserted needs to be secured on the upper side Z1 of the second accommodation chambers 1312, which increases the height of the housing 13' due to the height for that space. Therefore, from the viewpoint of space saving, the configuration in which the restriction recessed portion 1315 is provided is preferable.

Figure 12A:
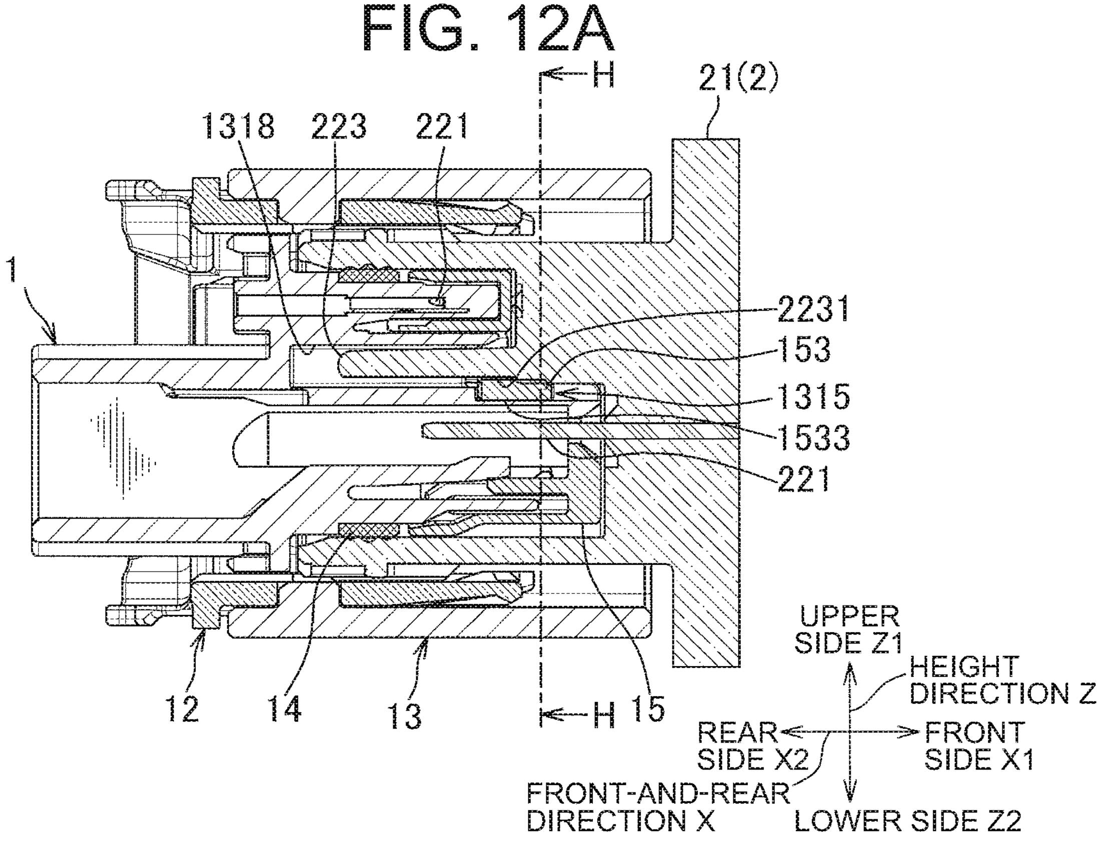
FIG. 12A is an assembly cross-sectional view of a connector and a mating connector according to a modified example.
Figure 12B:
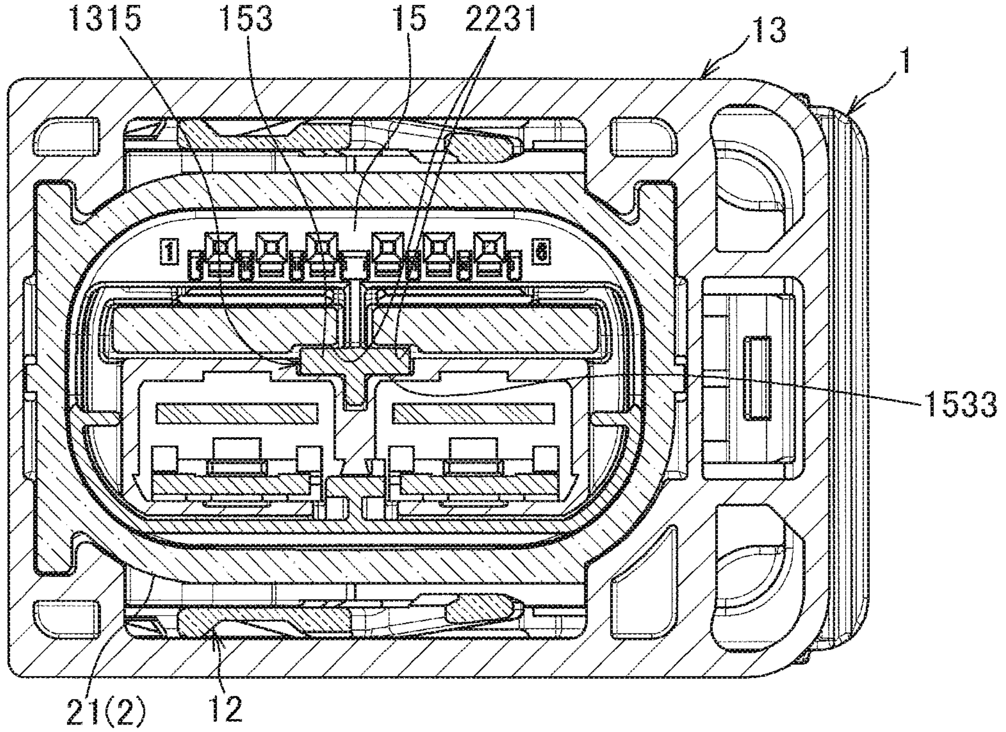
FIG. 12B is a cross-sectional view taken along line H-H of FIG. 12A as seen in the direction of arrows.

FIG. 12A is an assembly cross-sectional view of a connector 1 and a mating connector 2 according to a modified example FIG. 12B is a cross-sectional view taken along line H-H of FIG. 12A as seen in the direction of arrows. This modification is different from the above-described embodiment in that an accommodation recessed portion 2231 that is recessed toward the upper side Z1 is provided on portions of the lower wall surfaces of the prying engagement preventing portions 223. The accommodation recessed portion 2231 is a portion for accommodating the restriction protrusion 153. The inner wall surface (a wall surface facing the lower side Z2) of the accommodation recessed portion 2231 is in contact with the upper surface (a surface opposite to the restriction surface 1533) of the restriction protrusion 153 when the mating connector 2 is engaged with the connector 1.

According to such a configuration, the restriction protrusion 153 can be accommodated in the accommodation recessed portion 2231 provided in the prying engagement preventing portions 223, and deformation or displacement of the restriction protrusion 153 can be restricted by the inner wall surface of the accommodation recessed portion 2231. For example, if the prying engagement preventing portions 223 do not have the accommodation recessed portion 2231, an increase in the plate thickness of the restriction protrusion 153 for the purpose of, e.g., improving the strength of the restriction protrusion 153 results in a necessity to move the position of the prying engagement preventing portions 223 to the upper side Z1 accordingly. In this case, due to the change in the arrangement of the prying engagement preventing portions 223, the size of the mating connector 2 may increase. However, according to the configuration with the accommodation recessed portion 2231, in a case where the plate thickness of the restriction protrusion 153 is increased, the depth of the accommodation recessed portion 2231 may be increased accordingly, and it is not necessary to change the arrangement of the prying engagement preventing portions 223. For this reason, it is not necessary to increase the size of the mating connector 2. Therefore, the connection structure capable of preventing the restriction protrusion 153 from deforming or displacing without increasing in size can be obtained.

LIST OF REFERENCE SIGNS

X front-and-rear direction (insertion direction)
Z height direction (deflection direction)
1 connector
11 terminal
13 housing
1314 accommodation portion
1315 restriction recessed portion
**1315*a*-1** contact surface
**1316*a*** latching portion
15 front holder
151 detection portion
152 latching lock
153 restriction protrusion
1533 restriction surface

What is claimed is:

1. A fixing structure of a connector, the fixing structure comprising:
- a housing having a tubular shape, the housing configured to receive a terminal in an insertion direction; and
- a front holder having a tubular shape, the front holder configured to engage with the housing in a direction opposite of the insertion direction,
- wherein the front holder comprises:
  - an engagement confirmation portion that protrudes toward the housing in the direction opposite of the insertion direction, the engagement confirmation portion configured to prevent the terminal from being removed from the housing;
  - a latching lock configured to elastically deform along a deflection direction orthogonal to the insertion direction, the latching lock spaced apart from the engagement confirmation portion along the deflection direction; and
  - a restriction protrusion between the engagement confirmation portion and the latching lock in the deflection direction,
- wherein the housing comprises:
  - an accommodation portion that is open toward the front holder in the insertion direction and that constitutes a space for accommodating the engagement confirmation portion;
  - a latching portion configured to latch the latching lock; and
  - a restriction recessed portion that is open toward the front holder in the insertion direction and that constitutes a space for accommodating the restriction protrusion,
- wherein a restriction surface extending in a direction orthogonal to the deflection direction is provided on the restriction protrusion,
- wherein a contact surface configured to come into contact with the restriction surface and support the restriction protrusion is provided on the restriction recessed portion, and
- wherein, in a case where the latching lock elastically deforms in the deflection direction, the restriction surface is in contact with the contact surface.

2. The fixing structure according to claim 1, wherein the restriction protrusion comprises:
- a standing portion rising in a direction opposite of the deflection direction; and
- a blade portion extending to both left and right sides of the standing portion, and the restriction surface is formed on a lower surface of the blade portion.

3. A connection structure comprising:
- a mating connector; and
- a connector comprising the fixing structure according to claim 1, wherein the mating connector is configured to engage with the housing of the fixing structure, and wherein the mating connector comprises a prying engagement preventing portion configured to come into contact with a surface of the restriction protrusion opposite to the restriction surface such that, the restriction protrusion is sandwiched between the prying engagement preventing portion and the contact surface of the restriction recessed portion, thereby restricting displacement of the restriction protrusion in the deflection direction.

4. The connection structure according to claim 3, wherein the prying engagement preventing portion comprises an accommodation recessed portion configured to accommodate the restriction protrusion, and an inner wall surface of the accommodation recessed portion is in contact with the surface of the restriction protrusion opposite to the restriction surface.

* * * * *